Dec. 25, 1962 J. R. WYATT 3,070,355
FAIRLEAD FOR USE IN GUIDING CABLE
Filed July 16, 1962 2 Sheets-Sheet 1
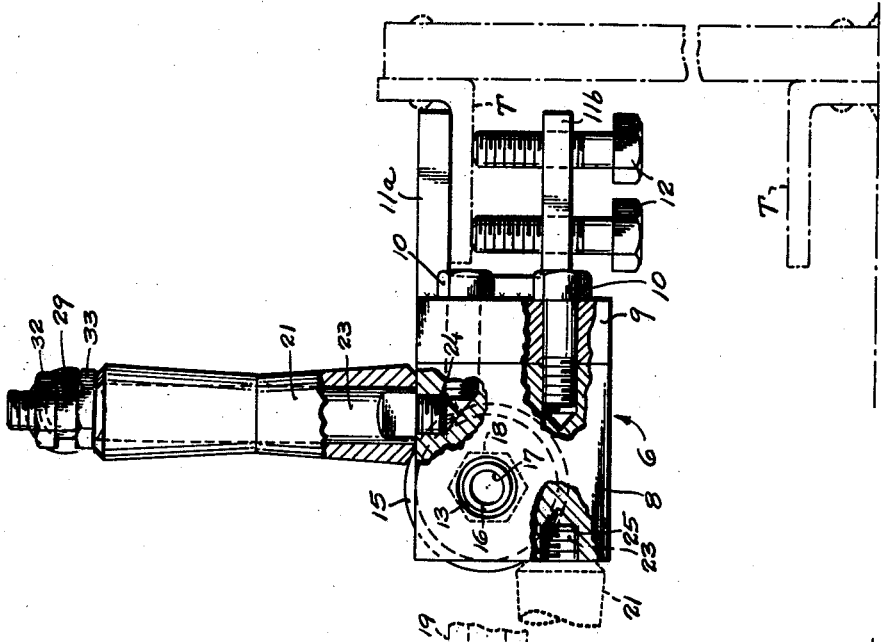
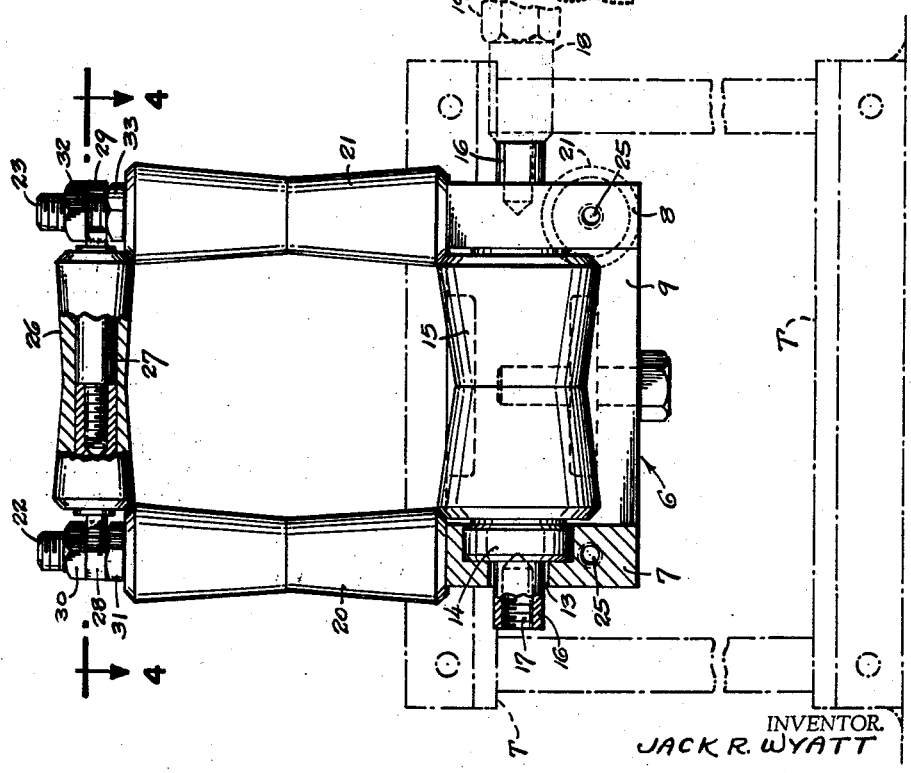
INVENTOR.
JACK R. WYATT
BY
ATTORNEYS Dec. 25, 1962   J. R. WYATT   3,070,355
FAIRLEAD FOR USE IN GUIDING CABLE
Filed July 16, 1962   2 Sheets-Sheet 2
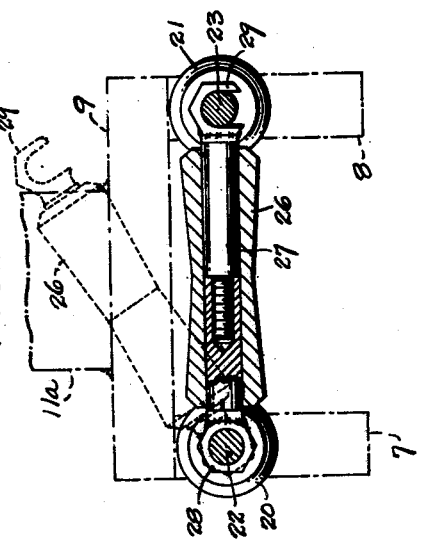
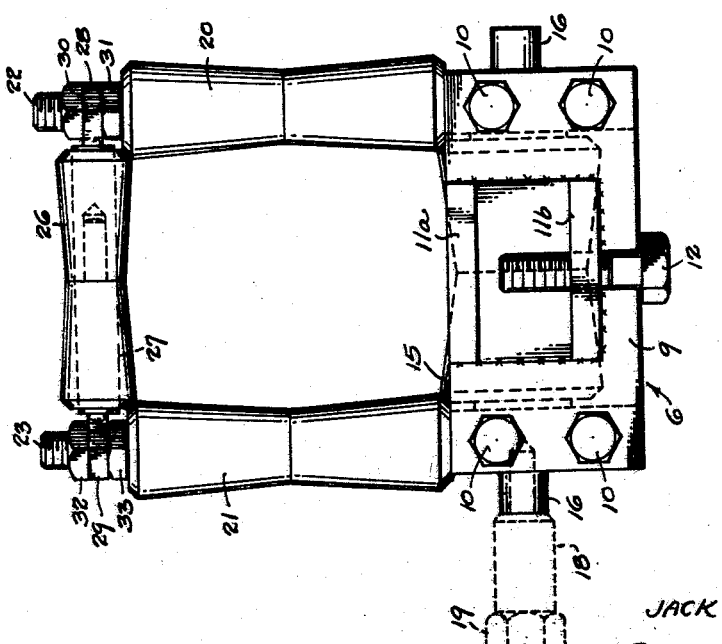
INVENTOR.
JACK R. WYATT
BY
ATTORNEYS United States Patent Office 3,070,355
Patented Dec. 25, 1962

3,070,355
FAIRLEAD FOR USE IN GUIDING CABLE
Jack R. Wyatt, 2638 Marine Drive, Bremerton, Wash.
Filed July 16, 1962, Ser. No. 210,053
14 Claims. (Cl. 254—134.3)

This invention relates to a fairlead for use in guiding cable. While self-evidently permitting wide latitude in the uses to which it is applied, the present invention has been particularly engineered with a view toward providing a fairlead which will greatly facilitate the work of stringing the extended footage of electrical cable which is customarily required on board a ship.

As one of its objects the invention aims to provide a fairlead which peculiarly adapts itself to the requirements of shipboard and allied usages where various available supports on which it becomes desirable to mount the fairleads, in order to best protect the cable being strung, may vary considerably in point of shape and placement.

A further object is to provide a ruggedly constructed fairlead of inexpensive construction which requires a minimum degree of servicing and yet one which permits quick and easy replacement of parts should occasion require.

These and yet additional objects and advantages in view will appear and be understood in the course of the following description and claims, the invention consisting in the novel construction and in the adaptation and combination of parts hereinafter described and claimed.

In the accompanying drawings:

FIGURE 1 is a view partly in front elevation and partly in section illustrating a cable guide embodying teachings of the present invention. Incorporated in the view is a phantom illustration of a supporting rack for the cable guide, and a broken-line showing of a drive adapter for the guide.

FIG. 2 is a side elevational view thereof.

FIG. 3 is a rear elevational view with the cable rack deleted; and

FIG. 4 is a horizontal sectional view on line 4—4 of FIG. 1.

Referring to said drawings, the numeral 6 designates a block which functions as a mounting for three of the fairleader's four rollers. The block has a yoke shape and is here shown as being a fabricated structure with the yoke arms 7 and 8 secured by cap-screws 10 to a base plate 9. The plate is desirably rectangular when viewed from the back, and the yoke arms also desirably have a rectangular shape when viewed from the end of the block. There are four of the cap screws 10 located in a pattern spacing the same equidistantly from the four corners. The base plate has a pair of rearwardly pointing mounting flanges 11a and 11b welded thereto. One of these flanges is placed along one edge extremity of the plate and the other is spaced inwardly from the other edge extremity of the plate. Clamping screws 12 for the mounting of the block are threaded through the latter of these flanges. It will be apparent, in consequence of the placement of the bolts 10 at the four corners of a rectangle, that the yoke arms may be invertedly secured to the block 6 in either of two positions, so as to place the clamping screws at one or the other side of the yoke, selectively.

The two yoke arms are bored, as at 13, on a coinciding transverse axis, and these bores are each counter-bored from the inside face of the arm. Bearings 14 are fitted in the counter-bores. A roller 15, hereinafter referred to as a drive roller, is received in the space between said yoke arms and receives a journal from the bearings 14 by means of fixed trunnions 16. These trunnions project through the bores 13 and in their exposed ends present threaded sockets 17. Giving significance to the term "drive" as applied to the roller 15, the sockets 17 are adapted to receive, selectively, an adapter 18 presenting upon its outer end a hex head 19 for receiving rotation either from a manually turned crank or by a portable power tool.

The other two of the mentioned three rollers which are mounted on the block 6 are designated by 20 and 21, and are arranged to occupy parallel spaced positions normal to the journal axis of the drive roller 15 one surmounting one and the other surmounting the other of the two yoke arms 7 and 8. Posts 22 and 23 provide journals about which the rollers turn, and each of these posts presents a threaded inner end accommodated in a selected one of two sockets 24 and 25 formed in the related yoke arm so that the plane in which the two posts lie may either coincide with a plane common to the two yoke arms or be disposed normal thereto. The two selectively employed sockets are in each instance offset laterally from the rotary axis of the drive roller 15, thus permitting the side rollers 20 and 21 to overlap the roller 15 in a moderate degree and at the same time hold the roller 15 out of contact with such rollers 20 and 21. Outer ends of the posts project beyond the rollers and these exposed ends are also threaded.

The fourth roller is designated by 26 and is arranged to lie parallel with the drive roller 15 in a position spanning the outer end of the throat which is defined between the two rollers 20 and 21. The journal for roller 26 is provided by a pin 27. The pin presents flattened ends which project beyond the roller. One end 28 is made in the form of an eye and fits over the exposed upper end of one post 22 between a pair of clamping nuts 30—31. The other end 29 is made in the form of a hook or eye to catch over the exposed upper end of the other post 23 between a pair of clamping nuts 32—33.

While being applicable to manifold uses, my fairlead particularly lends itself to shipboard usage in facilitating the stringing of electrical cable. The fairleads may be mounted along established wire-ways, being clamped to a respective tier T of the racks which are welded or otherwise permanently installed along such ways, or can be mounted, if desired, on structural parts of the ship such, for example, as bulkheads, ribs and the like. The ability to invertedly mount the yoke arms and to apply the posts for the side rollers in either of two sockets selectively so that the plane occupied by said posts lies either parallel with or at right angles to the plane occupied by the yoke arms permits the cable-guiding throat to be located in substantially any position which a given job may require, irrespective of the nature and placement of the particular projection to which the bracket is clamped. Cable can be quickly introduced to and removed from the guide throat by backing off the clamping nuts 31 and 33 in a degree sufficient to free the eye and hook of the pin 27 and then swinging said pin laterally into an out-of-the-way position about the post 22 as a center.

It is believed that the invention and the manner of its usage will have been clearly understood from the foregoing detailed description of my illustrated now preferred embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In a cable guide, a mounting block, a pair of posts each having one end fixedly secured to the block so that the two posts occupy parallel spaced positions, two side rollers each sleeved upon a respective one of the two posts to receive a rotary journal therefrom, the outer ends of said posts protruding beyond the rollers, an inner roller arranged to span the inner end of the throat defined by the side rollers and receiving a journal from the block for rotation about an axis at right angles to the axes of the side rollers, an outer roller arranged to span the outer end of the throat defined between said side rollers, and a pin providing a journal mounting for the outer roller formed upon each of its two ends with an eye, one of which eyes fits one and the other of which eyes fits the other of said protruding ends of the posts, said protruding ends of the posts being threaded to accommodate pairs of nuts one pair to clamp the eye therebetween and the other pair to clamp the other eye therebetween.

2. In a cable guide, a mounting block formed to present a yoke having two spaced-apart side arms yoked by a cross-member, a pair of posts each having one end fixedly secured to the block so that the two posts occupy parallel spaced positions at opposite sides of a line median to the two arms of the yoke, two side rollers each sleeved upon a respective one of the two posts to receive a rotary journal therefrom, the outer ends of said posts protruding beyond the rollers, the two arms of the yoke being each bored on a coinciding axis, an inner roller arranged to occupy a position between the two arms of the yoke and at each of its two ends presenting a fixed trunnion receiving a journal mounting in a respective one of said two bores, an outer roller arranged to span the outer end of the throat defined between said side rollers, and a member providing a journal mounting for said outer roller having one end pivotally carried by the protruding end of one of said posts and the other end detachably secured to the protruding end of the other post, the two trunnions each providing a threaded socket exposed to the outer end, said sockets being identical so as to permit an adapter fitting for a portable uni-directional rotary power tool to be threaded into either of said trunnion sockets, selectively, so that uni-directional rotation of the power tool will turn the inner roller in either of two directions, selectively, according to the socket employed.

3. In a cable guide, a mounting block formed to present two spaced-apart side arms yoked by a cross-member, a pair of posts one fixedly footing upon one and the other fixedly footing upon the other of the two side arms of the block so as to rise therefrom parallel to one another at opposite sides of a line median to said side arms, a respective side roller sleeved upon each of said posts to receive a rotary journal therefrom, the outer ends of said posts protruding beyond the rollers, an inner roller journaled from the side arms for rotation in the space therebetween about an axis at right angles to the axes of the side rollers, an outer roller arranged to span the outer end of the throat defined between said side rollers, and a pin providing a journal mounting for the outer roller formed upon one end with an eye fitting said protruding end of one post so as to swing about the latter as a pivot center and formed upon the other end with a hook arranged to releasably engage the protruding end of the other post, said protruding ends of the posts being threaded to accommodate pairs of nuts one pair to clamp the eye therebetween and the other pair to clamp the hook therebetween.

4. Structure according to claim 3, the block providing means for detachably securing the same to a support, and wherein the inner ends of said posts are threaded, the yoke arms each having a pair of mating threaded sockets placed one at right angles to the other and into a selected set of which the posts are removably fitted.

5. In a cable guide, a body formed to present a yoke pointing in one direction and a mounting channel pointing in the opposite direction and characterized in that the yoke provides two spaced-apart arms which occupy a position such that a plane median thereto is disposed at right angles to a plane median to the flanges of the channel, a pair of posts one fixedly footing upon one and the other fixedly footing upon the other of the two arms of the yoke so as to rise therefrom parallel to one another at opposite sides of said plane median to the arms of the yoke, a respective side roller sleeved upon each of said posts to receive a rotary journal therefrom, the outer ends of said posts protruding beyond the rollers, an inner roller journaled from the yoke arms for rotation in the space therebetween about an axis at right angles to the axes of the side rollers, and an outer journal-mounted roller carried by said protruding outer ends of the posts in a position spanning the outer end of the throat defined between said side rollers and locating its journal axis in the same plane as that in which the journal axes of the side rollers lie.

6. Structure according to claim 5 in which the journal mount for the outer roller comprises a pin having an eye upon one end and a hook upon the other end, the protruding ends of the posts being threaded to accommodate pairs of nuts one pair to clamp the eye therebetween and the other pair to clamp the hook therebetween.

7. Structure according to claim 5 in which the inner ends of the posts are threaded, the yoke arms each having at least two mating threaded sockets placed one at right angles to the other and into a selected set of which the posts are removably fitted.

8. Structure according to claim 7, the mounting channel and the arms of the yoke being separable and being secured by a set of four bolts, two bolts to a respective arm, located one bolt of said set of four at each of the four corners of a rectangle so as to permit the arms to be applied in either of two invertedly mounted positions selectively.

9. Structure according to claim 7, the mounting channel and the arms of the yoke being separable, the flanges of said channel being located one at one edge extreme of a web section and the other spaced inwardly from the opposite edge extreme of said web section, the latter said flange having clamping screws carried thereby, the web section being secured to the yoke arms by a set of four bolts, two bolts to a respective arm, located one bolt of said set of four at each of the four corners of a rectangle so as to permit the channel to be applied in either of two invertedly mounted positions selectively.

10. Structure according to claim 5 in which the two arms of the yoke are each bored on a coinciding axis, and wherein the journal for the inner roller comprises trunnions fixed to the roller and receiving a rotary mounting in the bores, exposed identical couplings being provided on the outer ends of said trunnions permitting an adapter fitting for a portable unidirectional rotary power tool to be attached to either of said couplings, selectively.

11. In a cable guide, a mounting block formed to present a yoke which provides two spaced-apart side arms yoked by a cross-member, a pair of posts each having one end fixedly secured to the block so that the two posts occupy parallel spaced positions at opposite sides of a line median to the two arms of the yoke, two side rollers each sleeved upon a respective one of the two posts to receive a rotary journal therefrom, the outer ends of said posts protruding beyond the rollers, the two arms of the yoke being each bored on a coinciding axis, an inner roller arranged to occupy a position between the two arms of the yoke and at each of its two ends presenting a fixed trunnion receiving a journal mounting in a respective one of said two bores, and an outer roller arranged to span the outer end of the throat defined between said side rollers, the two trunnions each providing a threaded socket exposed to the outer end, said sockets being identical so as to permit an adapter fitting for a portable unidirectional rotary power tool to be threaded into either of said trunnion sockets, selectively.

12. In a cable guide, a mounting block, a pair of posts each having one end fixedly secured to the block so that the two posts occupy parallel spaced positions, two side rollers each sleeved upon a respective one of the two posts to receive a rotary journal therefrom, the outer ends of said posts protruding beyond the rollers, an inner roller arranged to span the inner end of the throat defined by the side rollers and receiving a journal from the block for rotation about an axis at right angles to the axes of the side rollers, an outer roller arranged to span the outer end of the throat defined between said side rollers, and a pin providing a journal mounting for the outer roller formed upon each of its two ends with an eye one of which eyes fits one and the other of which eyes fits the other of said protruding ends of the posts, said protruding ends of the posts being threaded to accommodate pairs of nuts to removably clamp the eyes therebetween, the pin locating the journal axis of the outer roller in the same plane as that in which the journal axes of the side rollers lie.

13. Structure according to claim 5 in which means are provided permitting the posts to be adjustably located upon the block in either of two positions, selectively, one of which locates the plane occupied by said posts parallel with said plane which is median to the flanges of the channel and the other of which positions rotates said plane occupied by the posts 90° about an axis contained in both the plane of the posts and said plane median to the flanges.

14. In a cable guide, a body formed to present a yoke pointing in one direction and a mounting channel pointing in the opposite direction and characterized in that the yoke provides two spaced-apart arms which occupy a position such that a plane median thereto is disposed at right angles to a plane median to the flanges of the channel, a pair of posts one fixedly footing upon one and the other fixedly footing upon the other of the two arms of the yoke so as to rise therefrom parallel to one another at oppposite sides of said plane median to the arms of the yoke, a respective side roller sleeved upon each of said posts to receive a rotary journal therefrom, the outer ends of said posts protruding beyond the rollers, an inner roller journaled from the yoke arms for rotation in the space therebetween about an axis at right angles to the axes of the side rollers, and an outer journal-mounted roller carried by said protruding outer ends of the posts in a position spanning the outer end of the throat defined between said side rollers, means being provided permitting the posts to be selectively located in either of two positions adjusted relative to the mounting channel, one of which positions locates the plane occupied by said posts parallel with said plane which is median to the flanges of the channel and the other of which positions rotates said plane occupied by the posts approximately 90° from the first said position about an axis contained, approximately, in both the plane of the posts and said plane median to the flanges.

References Cited in the file of this patent

UNITED STATES PATENTS

| | | |
|---|---|---|
| 2,339,926 | Hays | Jan. 25, 1944 |
| 2,768,811 | Le Geu | Oct. 30, 1956 |
| 2,949,279 | Eitel | Aug. 16, 1960 |